United States Patent
Kamano et al.

(10) Patent No.: US 7,810,863 B2
(45) Date of Patent: Oct. 12, 2010

(54) MOLDING METHOD, MOLDED PRODUCT AND INSTRUMENT PANEL

(75) Inventors: Yoshifumi Kamano, Fuji (JP); Hajime Mochizuki, Fuji (JP); Shingo Yanagibashi, Fuji (JP); Norio Hayakawa, Fuji (JP); Enda Clarke, Swords (IE); Yasunori Sei, Fuji (JP)

(73) Assignee: Nihon Plast Co., Ltd. (JP)

( * ) Notice: Subject to any disclaimer, the term of this patent is extended or adjusted under 35 U.S.C. 154(b) by 296 days.

(21) Appl. No.: 11/962,864

(22) Filed: Dec. 21, 2007

(65) Prior Publication Data

US 2008/0185863 A1  Aug. 7, 2008

(30) Foreign Application Priority Data

Dec. 28, 2006  (JP)  .............. 2006-356413

(51) Int. Cl.
*B62D 25/14* (2006.01)

(52) U.S. Cl. .......................... 296/70; 180/90

(58) Field of Classification Search ............ 296/70; 180/90
See application file for complete search history.

(56) References Cited

U.S. PATENT DOCUMENTS

| | | | | |
|---|---|---|---|---|
| 4,508,381 A | * | 4/1985 | Herring | 296/70 |
| 5,685,595 A | * | 11/1997 | Nishijima et al. | 296/70 |
| 5,813,288 A | * | 9/1998 | Simonetti | 296/70 |
| 6,896,310 B1 | * | 5/2005 | Trappe et al. | 296/70 |
| 7,077,431 B2 | * | 7/2006 | Gayer et al. | 296/70 |
| 7,607,691 B2 | * | 10/2009 | Arnold et al. | 296/70 |
| 2006/0053910 A1 | | 3/2006 | Choi | |

FOREIGN PATENT DOCUMENTS

| | | |
|---|---|---|
| CN | 1749065 | 3/2006 |
| DE | 834140 | 3/1952 |
| DE | 19941674 | 3/2001 |
| JP | 2000-272377 | 3/2000 |

OTHER PUBLICATIONS

Chinese Official Action from corresponding case, dated Oct. 30, 2009.
German Official Action from corresponding case, dated Jan. 28, 2009; English translation included.

* cited by examiner

*Primary Examiner*—Lori L Lyjak
(74) *Attorney, Agent, or Firm*—NDQ&M Watchstone LLP (57) ABSTRACT

An instrument panel includes a panel body and a joint member. The panel body includes a core member and an outer layer that covers the core member, and is formed by reaction injection molding. The panel body includes a meter installed portion. A recess of the meter installed portion becomes an undercut at the time of molding. A core member is provided with a deformable portion which is elastically deformable. The molded panel body can be demolded by deforming the deformable portion. There is no need to provide a slide core with a molding die. A deformation of the deformable portion is prevented by installing the joint member onto the demolded panel body. According to the instrument panel, it is possible to improve a product quality and reduce manufacturing cost.

5 Claims, 6 Drawing Sheets

MOLDING METHOD, MOLDED PRODUCT AND INSTRUMENT PANEL

BACKGROUND OF THE INVENTION

1. Field of the Invention

The present invention relates to a molding method of a molded product (such as an automobile interior component) by die molding, a molded product, and an instrument panel.

2. Description of the Related Art

Conventionally, an instrument panel, which is installed with facing a front-seat passenger of a motor vehicle and made of a synthetic resin, is known. For example, the instrument panel is configured with a polypropylene base member and a decorative sheet disposed on the base member (for example, Japanese Patent Application Laid-open No. 2000-272377). The decorative sheet includes a foam layer made of polypropylene and a skin layer made of olefin or styrene elastomer. In this configuration, the decorative sheet is preliminarily inserted into a cavity of a die, and then a material of the base member is injected into the cavity to mold the instrument panel.

SUMMARY OF THE INVENTION

An instrument panel has a tubular opening and a component such as a meter is installed in the opening. However, a gap is generated if there is a dimensional error. As a result, its appearance is deteriorated. Accordingly, it can be considered to form a step at an installed portion of the component, but the step causes an "undercut". In this case, since the die needs a slide core for the undercut, die structure needs a complex mechanism. As a result, manufacturing cost is increased.

It becomes possible to decrease the manufacturing cost if the outer layer and the base member are formed inside the die without using a preliminarily formed decorative sheet. However, a resin raw material of the outer layer may be transuded from a parting line of the slide core and a burr may be formed if the slide core is used for the undercut. As a result, the appearance is deteriorated. Therefore, removal processing of the burr is needed, and it is not easy to improve the appearance. Thus, the manufacturing cost increases after all.

An object of the present invention is to provide a molding method of a molded product capable of reducing manufacturing cost and easily improving its appearance, a molded product, and an instrument panel.

A first aspect of the present invention provides a molding method of a molded product with molding dies which has a cavity. The cavity has a deep-set portion and a step, which causes an undercut on a molded product, on an inner surface of the deep-set portion. The method comprising: injecting resin raw material into the cavity to mold the molded product, curing the product for soldificating the molded product which has a deformable portion which is positioned nearby an deep end of the deep-set portion, deforming the deformable portion for disengaging the undercut from the step, and demolding the molded product from the cavity.

According to the first aspect of the present invention, a molded product having an undercut can be removed (demolded) from a die without a slide core. Accordingly, a die structure can be simplified and manufacturing cost can be reduced. Further, since there is no parting line of the die at an undercut, its appearance is improved.

Here, it is preferable that a core member of the molded product has been molded preliminarily, the core member is inserted into the cavity, and the resin raw material is injected into the cavity for insert-molding an outer layer on the core member.

In this manner, a molded product of which a core member is covered with an outer layer can be molded integrally. Since there is no parting line of a die at an undercut, a resin raw material is not transuded from the parting line. Thus, no burr is formed. Since a removing-burr process is not needed, the appearance is improved.

A second aspect of the present invention provides a molded product which comprises: a protruded portion having an opening on a base end thereof, a recess, which has caused an undercut when the molded product has been molded, on the protruded portion, and a deformable portion formed nearby a distal end of the protruded portion for reducing an opening area of the opening by deforming.

According to the second aspect of the present invention, a molded product having an undercut can be removed (demolded) from a die by deforming a deformable portion. The die doesn't need a slide core mechanism. Accordingly, a die structure can be simplified and manufacturing cost can be reduced. Further, since there is no parting line of the die at an undercut, its appearance is improved.

A third aspect of the present invention provides an instrument panel disposed in a vehicle compartment with facing a passenger, which comprises: a protruded portion having an opening on a base end thereof, the opening facing toward an opposite direction against the passenger, a recess, which has caused an undercut when the instrument panel has been molded, on the protruded portion for mounting a vehicle component, and a deformable portion formed nearby a distal end of the protruded portion for reducing an opening area of the opening by deforming.

According to the third aspect of the present invention, similar to the second aspect, a die structure can be simplified and manufacturing cost can be reduced. Further, since there is no parting line of the die at an undercut, its appearance is improved. Since a gap between components and the instrument panel is hidden when the parts are installed in a recess, the appearance is improved.

Here, it is preferable that the recess is formed annularly, and the protruded portion has deformable grooves or slits in order to allow an annular deformation of protruded portion.

In this manner, the product can be easily removed (demolded) from the die when a protruded portion having an annular recess is deformed in a radial direction. There is no need to provide a slide core in the die.

It is further preferable that the instrument panel further comprises at least one joint member which is attached onto an edge of the opening in order to prevent a deformation of the deformable portion.

In this manner, since rigidity is secured by a joint member, a deformation of a deformable portion is restricted after the instrument panel has been installed.

It is further preferable that the protruded portion is a meter hood. In addition, it is further preferable that the vehicle component is a combination meter assembly.

DETAILED DESCRIPTION OF THE EMBODIMENT

A molding method of a molded product, a molded product, and an instrument panel according to a first embodiment of the present invention will be described below with reference to the drawings.

Figure 1:
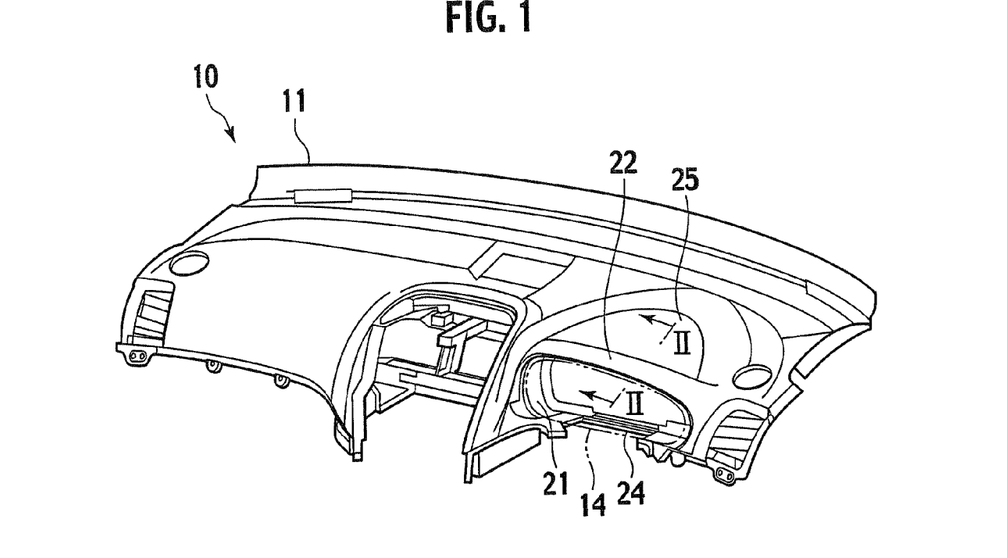
FIG. 1 is a perspective view of an instrument panel according to a first embodiment of the present invention.

An instrument panel (molded product) 10 shown in FIG. 1 is installed with facing front seats in a compartment of an automobile (a vehicle). The instrument panel 10 is a vehicle interior component installed in a vehicle body with facing front-seat passengers. As shown in FIG. 1 to FIG. 7, the instrument panel 10 includes a panel body (molded product) 11 and a joint member 12 (FIGS. 2 and 8) installed onto the panel body 11. The instrument panel 10 further includes a meter assembly 14 (FIGS. 1 and 2), a ventilator (not shown), various switches (not shown), or the like, whereby an instrument panel assembly is configured.

A forward direction of the motor vehicle is used as a reference to describe directions such as above, below and both sides. Furthermore, with respect to the instrument panel 10 or the like, a description is given such that a side on which to face the passenger is referred to as front, and a side on which to be positioned forwardly of the automobile is referred to as rear.

Figure 2:
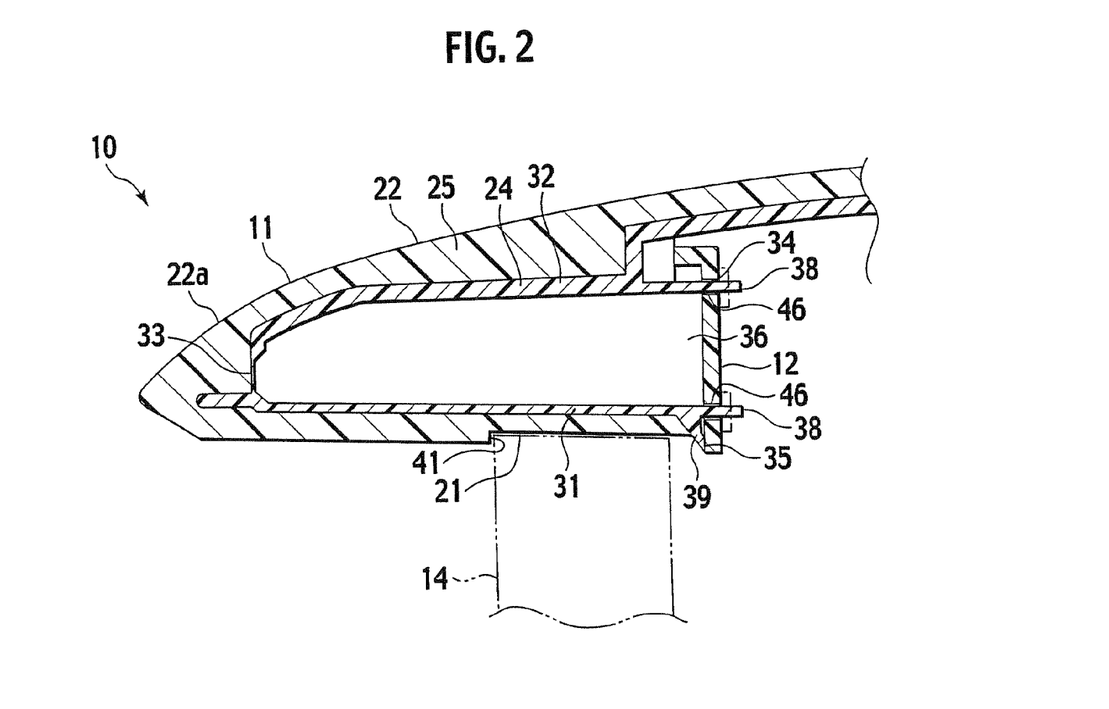
FIG. 2 is a cross-sectional view taken along a line II-II of FIG. 1.
Figure 3:
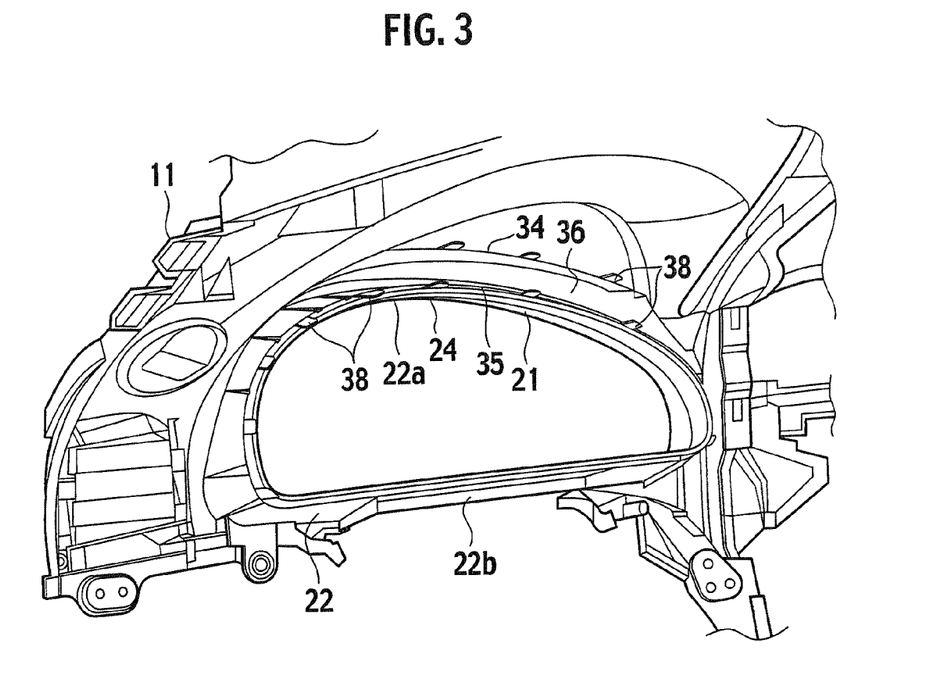
FIG. 3 is a partial perspective view of a rear side of a panel body.

The panel body 11 is positioned with facing a driver seat and includes a meter-installed portion (component installed portion) 21. The meter-installed portion 21 has a horizontally elongate flattened tubular hood (protruded portion) 22. The meter assembly 14 is installed below the hood 22 by embedding or screwing. As shown in FIG. 2, the hood 22 is configured such that a core member (base material) 24 formed of a synthetic resin and an outer layer 25 which covers at least a passenger side of the core member 24 are integrally molded. The outer layer 25 is an outer skin formed of a synthetic resin. The hood 22 is a so-called polyurethane RIM (reaction injection molding) trim component.

The core member 24 is harder than the outer layer 25 and formed of a slightly elastically deformable synthetic resin (for example, polypropylene). The hood 22 (an upper portion 22a of the meter installed portion 21 called a meter hood or a meter visor or the like) includes a first board 31, a second board 32, and a deformable portion 33. And the hood 22 is formed in an approximately U-shape in its cross section. The first board 31 has an almost plate-like shape. The second board 32 has an almost plate-like shape and is located above the first board 31. The deformable portion 33 connects the first board 31 and the second board 32 on the front side. The deformable portion 33 is formed more thinly than the first board 31 and the second board 32. The deformable portion 33 elastically deforms to function as a hinge.

The outer layer 25 is also referred to as a pad, and is softer than the core member 24. The outer layer 25 is formed by RIM molding of polyol and isocyanate with a molding die within which the core member 24 has been preliminarily inserted. The outer layer 25 is configured integrally with the core member 24 by unfoamed polyurethane. The outer layer 25 covers the passenger side of the core member 24 (that is, the front side of the deformable portion 33, a bottom surface of the first board 31 and an upper surface of the second board 32 are covered by the outer layer 25). Since a center of a lower portion 22b (FIGS. 3 and 4) below the hood 22 is covered with the meter assembly 14, and thus, the outer layer 25 is not formed on the center of the lower portion 22b.

The upper portion 22a of the meter-installed portion 21 of the panel body 11 includes edges 34 and 35 on the rear. Therefore, the upper portion 22a has an opening 36 between the edges 34 and 35 on the rear. The upper portion 22 is formed in an approximately U-shape in its cross section. The upper portion 22a functions as the meter hood which covers over the meter assembly 14.

Figure 4:
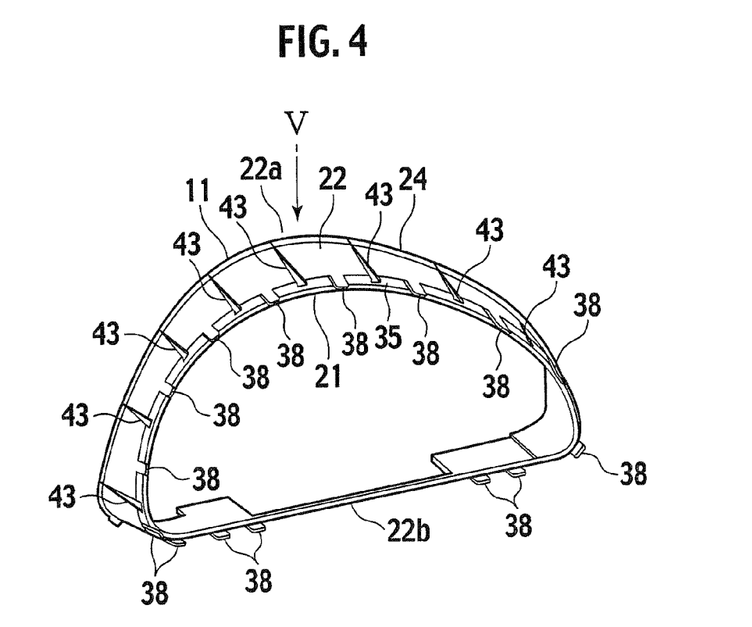
FIG. 4 is a partial perspective view of the rear side of the panel body.
Figure 5:
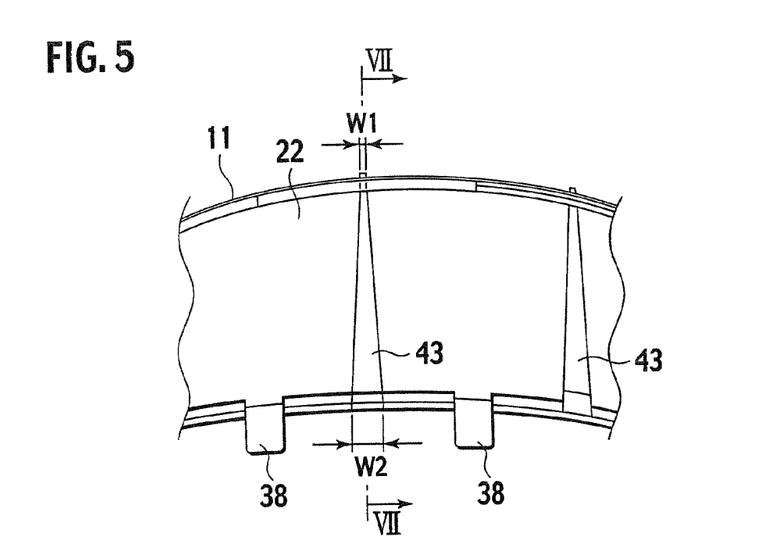
FIG. 5 is a partial plan view as viewed from a direction of an arrow V of FIG. 4 of the panel body.
Figure 6:
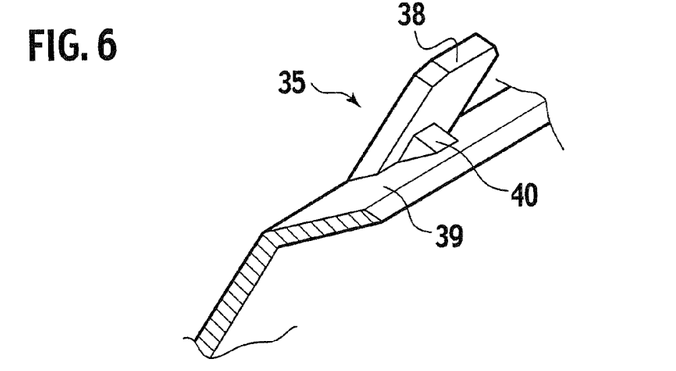
FIG. 6 is a partial enlarged perspective view of the panel body.

As shown in FIGS. 2 to 6, the edges 34 and 35 of the core member 24 are provided with connecting tabs 38 protruded toward the rear. At least one of the edges 34 and 35 (in the present embodiment, the edge 35 of the first board 31) of the core member 24 is provided with a downwardly slanted support flange 39 (FIGS. 2 and 6). Note that, the connecting tabs 38 are extended not downwardly but horizontally. That is, the connecting tabs 38 and the support flange 39 are formed with a slight gap therebetween. Each of the connecting tabs 38 is connected with the support flange 39 by a rib 40 (FIG. 6) to be reinforced. The connecting tabs 38 are protruded toward the rear also from the lower portion 22b beneath the hood 22 (FIG. 4).

As shown in FIG. 2, the upper portion 22a of the meter-installed portion 21 is provided with a recess (undercut) 41. The recess 41 is positioned in a middle of the first board 31 on a front-rear direction (lateral direction of FIG. 2). The recess 41 is formed such that the outer layer 25 on the first board 31 is recessed upwardly (and slightly sidewise in a curved portion on the first board 31). The recess 41 configures the meter-installed portion 21. The recess 41 enlarges an inner width in a vertical direction (lateral direction) of the meter-installed portion 21.

A circumferential front edge of the meter assembly 14 is hidden in the recess 41 when the meter assembly 14 is installed to the meter-installed portion 21. Therefore, the passenger does not find a gap between the panel body 11 and the meter assembly 14 even when a slight dimensional error generates in the panel body 11 or the like. And thus, a good appearance is provided.

Figure 7:
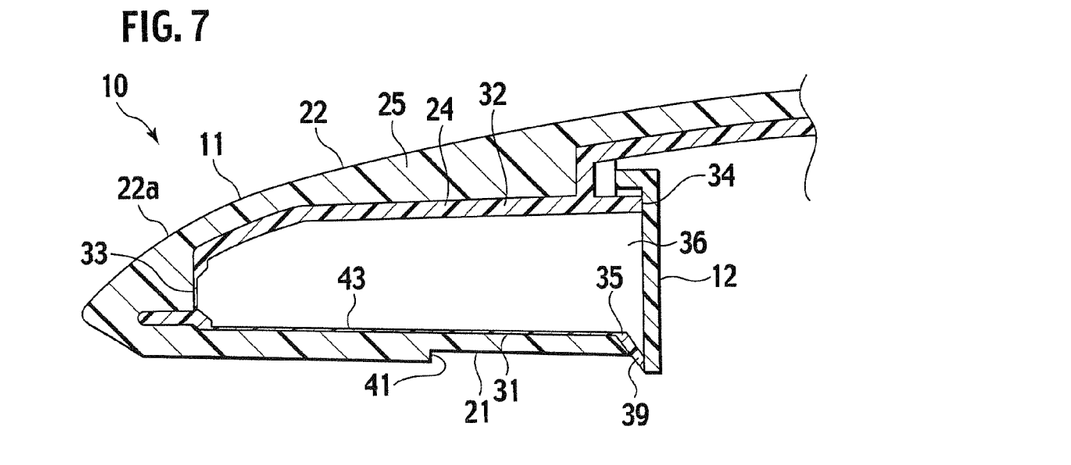
FIG. 7 is a cross-sectional view taken along a line VII-VII of FIG. 5.

As shown in FIGS. 4, 5, and 7, the hood 22 including the meter installed portion 21 is provided with deformable grooves 43 which arranged at some intervals and can elastically deform. A thickness of the core member 24 in each of the deformable grooves 43 is thinner (film-like shape, for example) than that of other areas of the core member 24. A width of each of the deformable grooves 43 is enlarged from W1 to W2 from the front toward the rear. It becomes possible to increase a deformation amount of the first board 31 of the hood 22 when the deformable grooves 43 and vicinity areas thereof are elastically deformed.

Figure 8:
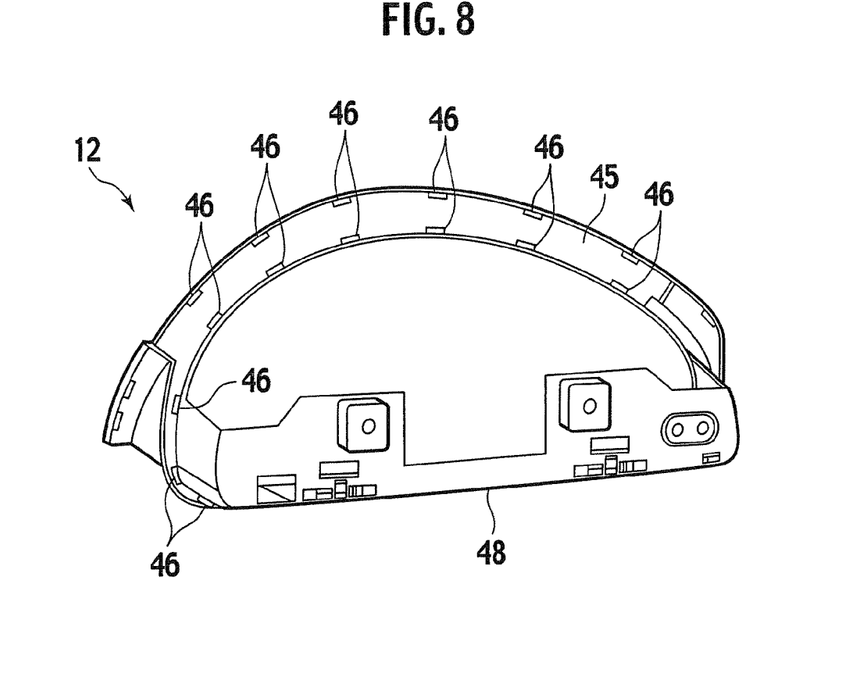
FIG. 8 is a perspective view of a joint member.

The joint member 12 is made of a synthetic resin. The joint member 12 is provided for restraining a deformation of the deformable portion 33 to keep a shape of the hood 22. As shown in FIG. 8, the joint member 12 includes a main bar 45. Connecting holes 46 into which the connecting tabs 38 are respectively inserted are formed in the main bar 45. The joint member 12 also includes a back plate 48, on which the rear of the meter assembly 14 is fixed. The main bar 45 and the back plate 48 configure the joint member 12 integrally.

Subsequently, a description is given of a molding process of the instrument panel 10.

Figure 9:
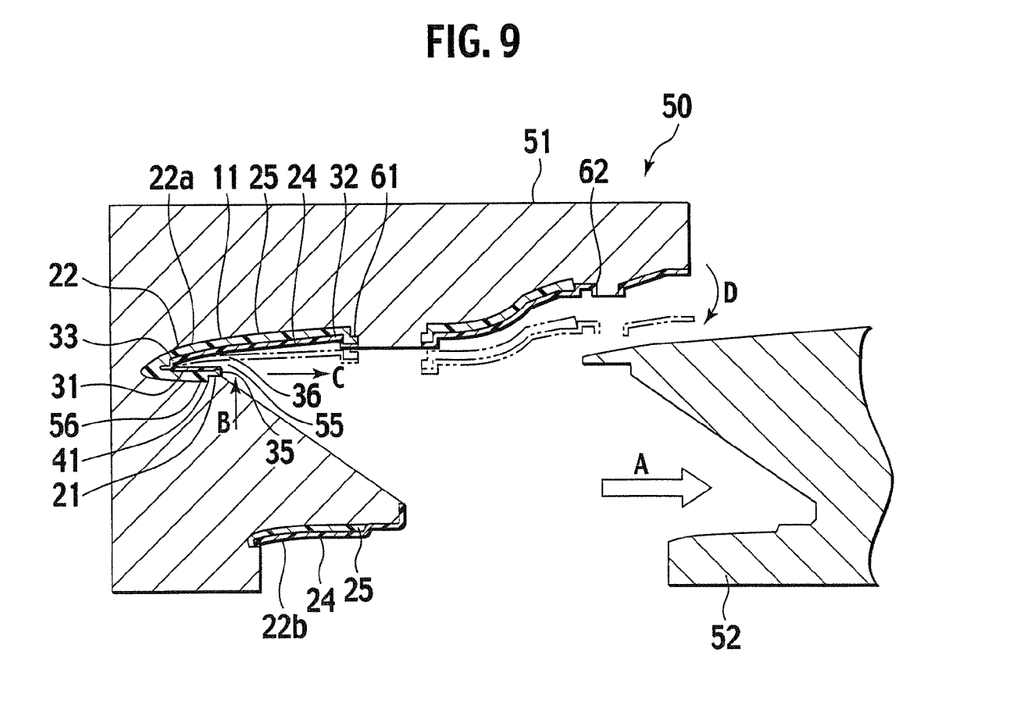
FIG. 9 is an explanatory diagram of a manufacturing process of the instrument panel according to the first embodiment.

First, the core member 24 of the panel body 11 is preliminarily die-molded with polypropylene (first resin raw material). Subsequently, the molded core member 24 is inserted into the cavity of the die, and the outer layer 25 is formed by the polyurethane RIM mentioned above, whereby the panel body 11 is die-molded. As shown in FIG. 9, a molding device 50, which is a manufacturing device of the panel body 11, includes a first die 51 and a second die 52. The second die 52 is driven by a pressing machine. The cavity into which the resin raw material is injected is formed within the closed dies 51 and 52. An inner surface of the cavity is a molding surface. The first die 51 is provided with a deep-set portion which forms the hood 22 (the upper portion 22a). The rear of the deep-set portion is opened as an opening 55. A projecting step 56 is formed on the molding surface which forms a bottom surface of the upper portion 22a.

The preliminarily molded core member 24 is inserted in the cavity, and then a liquid mixture of polyol and isocyanate (second resin raw material) is injected into the cavity. The soft outer layer 25 is formed along a molding surface of the first die 51 and then integrally covers an outer surface of the core member 24. Thus, the panel body 11 is molded.

Subsequently, the second die 52 is moved in an A direction in FIG. 9 for mold opening after the outer layer 25 is solidified. An undercut (the recess 41) is formed by the step 56 of the first die 51 in a demold direction. Since the recess 41 is the undercut, the molded panel body 11 cannot be demolded (removed from the die) in the A direction directly. The deformable portion 33 is easily deformed when a force in a B direction in FIG. 9 is applied to the panel body 11. And then, the recess (undercut) 41 is disengaged from the step 56. Since the recess 41 is formed on the hood 22, the panel body 11 can be easily demolded in a C direction in FIG. 9 when the deformable grooves 43 formed on the hood 22 are deformed to move the first board 31 upward.

As shown in FIG. 9, component installed portions (such as a speaker hole 61 and a defroster-grill slit 62) which cause odd-shapes on the molding surface are formed on a portion extended from the second board 32. Since a large space exists beneath the molded component installed portions 61 and 62 after the second die 52 has been moved, the panel body 11 can be easily demolded by moving the panel body 11 in a D direction in FIG. 9.

The joint member 12 is attached to the panel body 11 removed from the molding device 50 (FIG. 2), so that deformations of the deformable portion 33 and the deformable grooves 43 are restricted. The connecting tabs 38 of the panel body 11 are inserted into the connecting holes 46 of the joint member 12, respectively. The joint member 12 is contacted with the edges 35 and 34 of the first board 31 and the second board 32, and then distal ends of the connecting tabs 38 are thermal caulked. As a result, the joint member 12 is fixed to the panel body 11.

In the present embodiment, the first die 51 having the step 56 for forming the recess 41 is used for molding the panel body 11. Therefore, the undercut (recess 41) which impedes demolding of the panel body 11 is formed. However, the demolding of the panel body 11 is facilitated by deformation of the deformable portion 33 of the core member 24 as a hinge. There is no need to provide a slide core with the molding device 50 and the panel body 11 can be demolded from the first die 51, and thus, so that the configuration of the molding device 50 can be simplified. Further, a durability of the die can be improved and the die can be downsized by enabling downsizing the press machine, and then manufacturing cost can be reduced.

Since the undercut (recess 41) is formed in the tubular hood 22 and the meter-installed portion 21 is annular, it may be sometimes difficult to facilitate the demolding of the panel body 11 only by the deformation of the deformable portion 33. However, in the present embodiment, the panel body 11 is easily demolded by the deformable grooves 43 of the hood 22 are deformed in addition to the deformable portion 33. Since the width of each of the deformable grooves 43 becomes wide toward the rear (toward the demold direction), the rear portion of the hood 22 is greatly deformed to facilitate demolding. Since the width of each of the deformable grooves 43 becomes wide toward the rear, the second die 52 which forms the deformable grooves 43 can be smoothly moved. Since the core member 24 is formed as the film even in the deformable grooves 43, a leakage of the resin raw material is prevented.

Since the resin raw material is injected into the cavity, within which the core member 24 is preliminarily inserted, the molding process for forming the outer layer 25 can be simplified as compared to a case where a outer skin sheet is preliminarily inserted within the cavity. As a result, manufacturing cost can be reduced. In particular, since the outer layer 25 is formed of unfoamed polyurethane, a foaming process is eliminated. As a result, the outer layer 25 can be formed in a short time.

Since the slide core is not needed, no parting line is formed along the step 56 for the recess (undercut) 41. Therefore, no burr is formed by a leakage of the second resin raw material transuded from the parting line of the slide core. Since a removing-burr process is not needed, manufacturing cost is reduced. In addition, it is never happened that a surface pattern is damaged by removing burr and that a barrier material for a surface protection is occurred by removing burr. Since a sharp edge can be easily formed by the step 56, a matching quality between the recess 41 and the component therein (meter assembly 14) can be improved. As a result, the appearance can be easily improved, and a quality in design can be improved.

If the parting line of the dies 51 and 52 is disposed at the support flange 39 extended downwardly at the edge 35 of the first board 31, a border line between the core member 24 and the outer layer 25 can be formed sharply. Further, a leakage of the low-viscosity resin raw material (polyurethane) of the outer layer 25 can be restricted by the support flange 39.

In the present embodiment, since the edges 34 and 35 which surround the opening 36 are joined by the joint member 12, the deformation of the deformable portion 33 and the deformable grooves 43 is restricted to improve the rigidity. As a result, the deformation of the deformable portion 33 and the deformable grooves 43 can be restricted after the instrument panel 10 has been assembled into a vehicle body. Further, since a surface sink due to a curing delay after the molding can be restricted as compared to improvement in rigidity by forming ribs, the appearance can be improved.

Since the support flange 39 and the connecting tabs 38 are positioned separately (has a space therebetween), the joint member 12 can be supported stably by both of the connecting tabs 38 and the support flange 39.

Since the ribs 40 is provided between the connecting tabs 38 and the support flange 39, the joint member 12 can be further supported stably by both of the connecting tabs 38 and the support flange 39.

A circumferential front edge of the meter assembly 14 is hidden by the recess 41 when the meter assembly 14 is installed in the recess 41 of the meter installed portion 21. Since a passenger does not find a gap between the panel body 11 and the meter assembly 14 even when a slight dimensional generates in the panel body 11 or the like, a high-quality instrument panel 10 having a good appearance can be provided.

In the embodiment described above, the edge 35 of the first board 31 is formed with the support flange 39 which is downwardly slanted. However, a shape of the edge 35 can take various forms. In the embodiment described above, the joint member 12 is molded separately from the panel body 11 and fixed to the panel body 11 by thermal caulking the distal ends of the connecting tabs 38. However, the panel body 11 and the joint member 12 can be integrally molded. Alternatively, the joint member 12 can be fixed to the panel body 11 by ultrasonic welding, adhesion, press-fitting, or engagement by pawls, or other methods.

Figure 10:
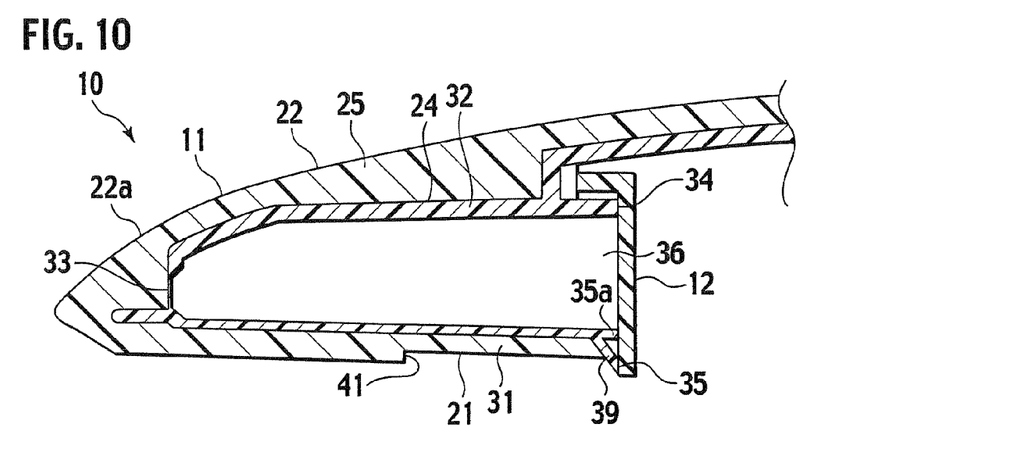
FIG. 10 is a corresponding view of FIG. 2 of a second embodiment of the present invention.
Figure 11:
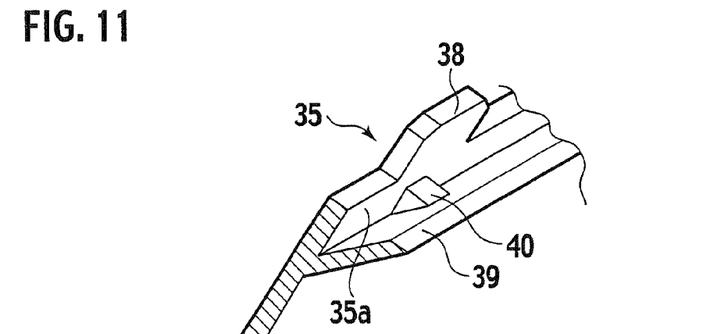
FIG. 11 is a partial enlarged perspective view of a panel body.

As shown in FIG. 10 and FIG. 11 (a second embodiment), the edge 35 can be formed with a joint flange 35a, in addition to the support flange 39. The joint flange 35a interlinks the connecting tabs 38. The joint flange 35a has a projecting amount same as that of the support flange 39. The joint flange 35a increases a contact area between the joint member 12 and the edge 35 (the support flange 39 and the joint flange 35a). As a result, the joint member 12 can be supported more stably.

Figure 12:
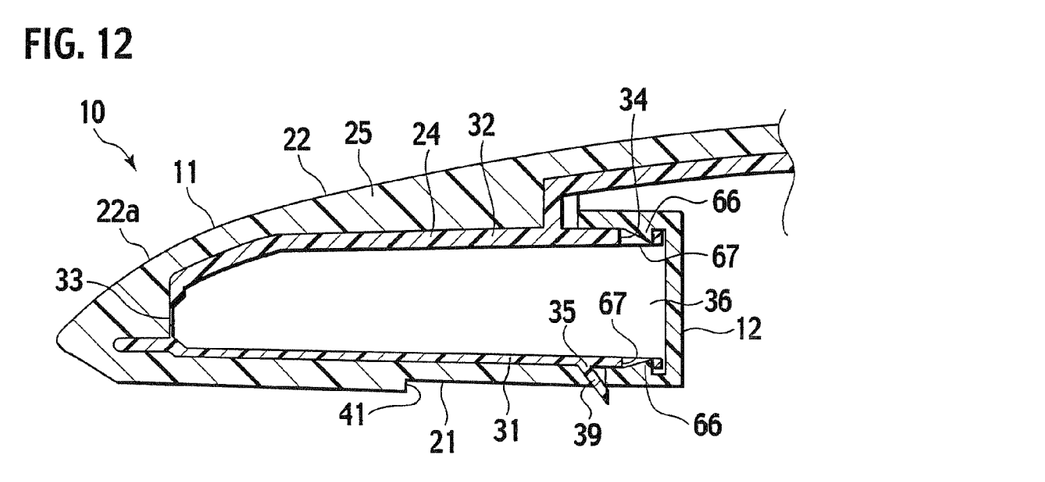
FIG. 12 is a corresponding view of FIG. 2 of a third embodiment of the present invention.

As shown in FIG. 12 (a third embodiment), pawls 66 can be provided with the joint member 12 and hooking holes 67 can be provided with the panel body 11. In this case, the pawls 66 are hooked in the hooking holes 67, respectively, so that the joint member 12 is fixed to the panel body 11 easily and firmly.

Figure 13:
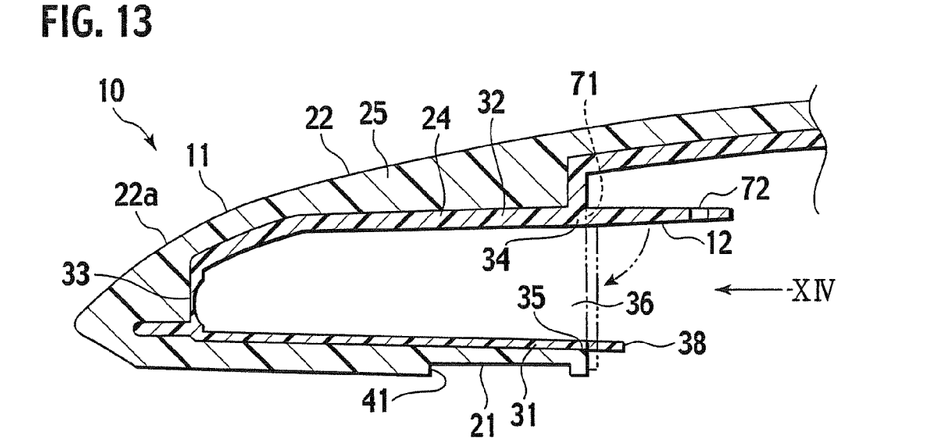
FIG. 13 is a corresponding view of FIG. 2 of a fourth embodiment of the present invention.
Figure 14:
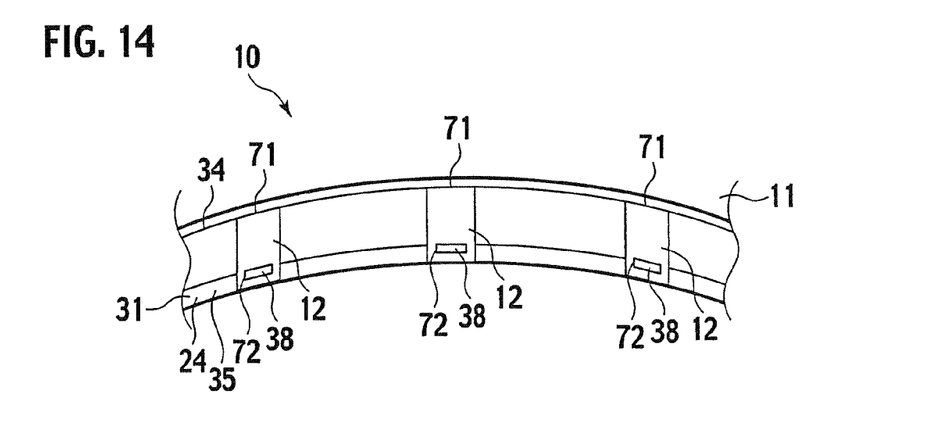
FIG. 14 is a rear view of the instrument panel as viewed from a XIV direction of FIG. 13.

As shown in FIG. 13 and FIG. 14 (a third embodiment), the panel body 11 can be formed integrally with joint members 12. The joint members 12 are formed as tabs each of which has an approximately square shape and extends from the end 34 of the second board 32. A base end (connecting portion with the second board 32) of each joint member 12 is formed as a bendable hinge 71. Connecting holes 46 are formed at open ends of the joint members 12, respectively. Each of the joint members 12 is bent at the hinge 71 so that the connecting tabs 38 are inserted into the connecting holes 46, respectively. The open ends of the joint members 12 are fixed to the edge 35 of the first board 31 by thermal caulking, pressure-fitting, ultrasonic welding, or the like. As a result, the joint members 12 are fixed to the panel body 11. In this manner, since the number of parts of the instrument panel 10 can be reduced, manufacturing cost and weight can be reduced.

Figure 15:
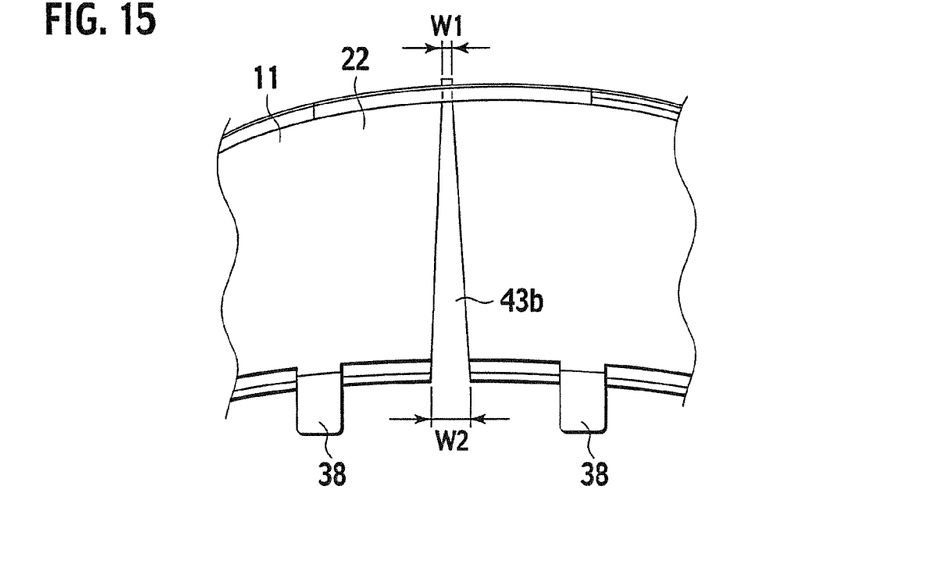
FIG. 15 is a corresponding view of FIG. 2 of a fifth embodiment of the present invention.

In the embodiment described above, each of the deformable grooves 43 is formed as a film-like portion of the core member 24. However, a thickness of the outer layer 25 can be made thin together with the core member 24. Alternatively, as shown in FIG. 15 (a fourth embodiment), deformable slits 43b can be formed by cutting the core member 24 and the outer layer 25. In this case, segmented portions of the first board 31 are interlinked only by the deformable portion 33 or by a front end portion of the first board 31 and the deformable portion 33.

What is claimed is:

1. An instrument panel disposed in a vehicle compartment facing a passenger, comprising:
    a protruded portion having an opening on a base end thereof, the opening facing toward an opposite direction against the passenger,
    a recess, which has caused an undercut when the instrument panel has been molded, on the protruded portion for mounting a vehicle component, and
    a deformable portion formed nearby a distal end of the protruded portion for reducing an opening area of the opening by deforming.

2. The instrument panel according to claim 1, wherein the recess is formed annularly, and
    the protruded portion has deformable grooves or slits in order to allow an annular deformation of protruded portion.

3. The instrument panel according to claim 2, further comprising
    at least one joint member which is attached onto an edge of the opening in order to prevent a deformation of the deformable portion.

4. The instrument panel according to claim 3, wherein the protruded portion is a meter hood.

5. The instrument panel according to claim 4, wherein the vehicle component to be mounted via the recess is a combination meter assembly.

* * * * *